Aug. 7, 1945.  W. H. HILL  2,381,285
METHODS OF MAKING ALKALI METAL CYANIDES
Filed Aug. 28, 1940
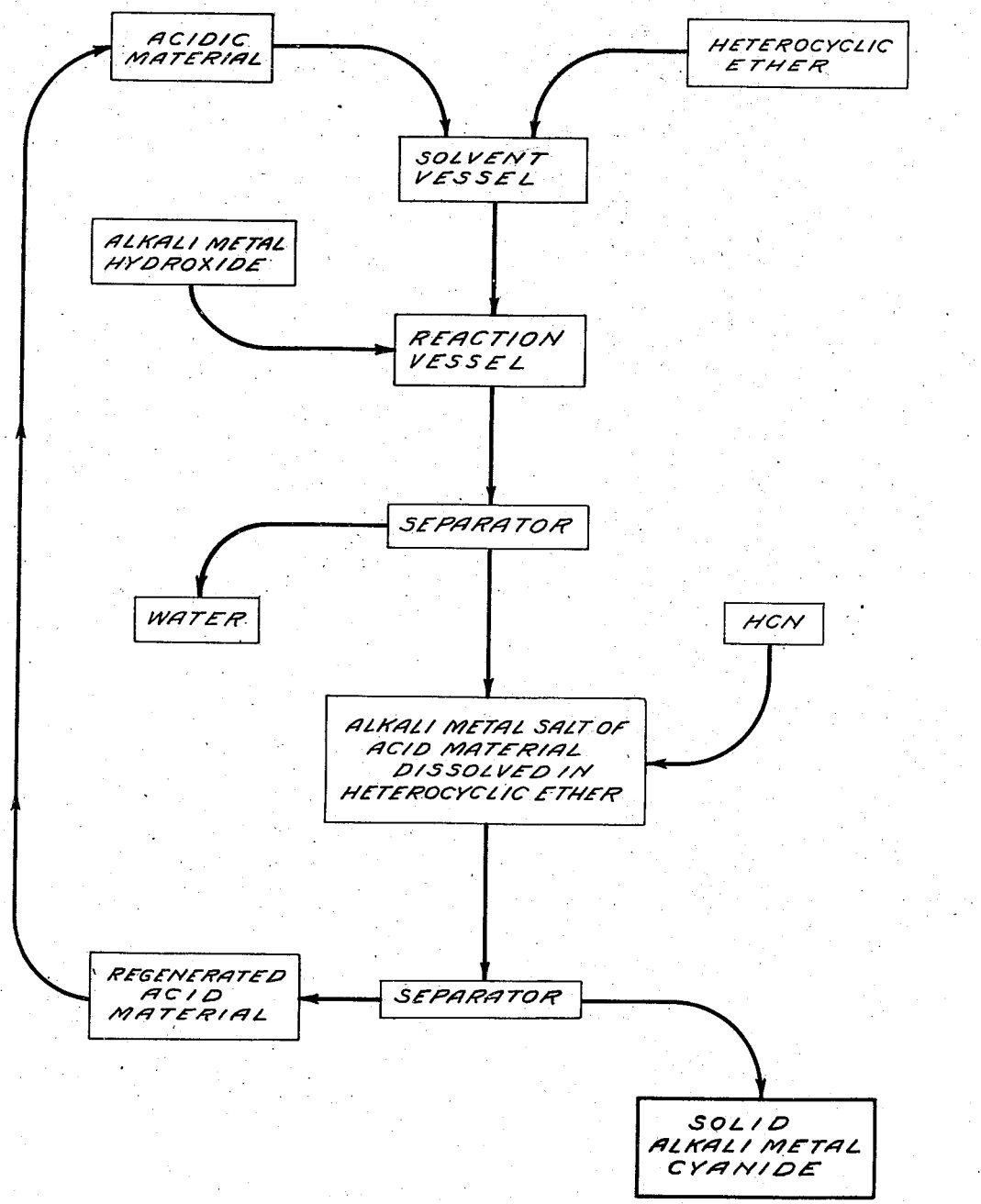
INVENTOR.
WILLIAM H. HILL,
BY Ellis S. Middleton
ATTORNEY.

Patented Aug. 7, 1945

2,381,285

UNITED STATES PATENT OFFICE 2,381,285

METHODS OF MAKING ALKALI METAL CYANIDES

William H. Hill, Mount Lebanon, Pa., assignor to American Cyanamid Company, New York, N. Y., a corporation of Maine Application August 28, 1940, Serial No. 354,477

9 Claims. (Cl. 23—79)

The present invention relates to methods of obtaining alkali metal cyanides of good purity and in solid form while avoiding the necessity for the recovery thereof from aqueous solutions. As is well known, difficulties encountered with prior art processes always had their origin in this necessity for removing water from the reaction mixture, inasmuch as sodium cyanide hydrolyzes and oxidizes in aqueous solution and cannot be technically recovered therefrom in pure form.

The present invention is based upon the discovery that alkali metal cyanides are insoluble in heterocyclic ethers.

The invention is further based upon the discovery that mono and poly nuclear phenols exhibiting an acidic characteristic, hereinafter referred to as acidic materials, as well as the alkali metal salts of such compounds, are soluble in heterocyclic ethers, and that such alkali metal salt solutions may be reacted with HCN to form the corresponding alkali metal cyanide which precipitates, the reaction regenerating the free acidic material which remains in the solution. It will be seen, therefore, that starting with the free acidic material in solution in the heterocyclic ether, the alkali metal salt thereof may be formed directly in solution by adding thereto the corresponding hydroxide.

The invention, however, is not limited in its broadest aspect to the formation of the alkali metal salt as above indicated, but contemplates the formation of alkali metal cyanide by reacting HCN with a heterocyclic ether solution of a sodium salt, however formed.

The solvents used in the present invention are heterocyclic ethers containing ring systems included in the group consisting of 1.4 dioxane

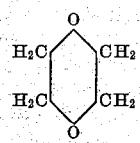

and 1.3 dioxane (metadioxane)

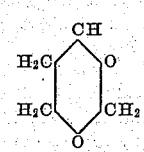

1.4 dioxene

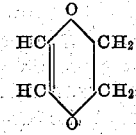

1.3 dioxene

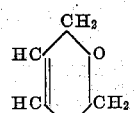

1.4 dioxine

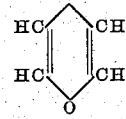

The simplest solvents of this type are dioxane, meta dioxane and 1.4 dioxene. Derivatives containing these ring systems which are free from reactive groups may also be used for example, alkyl substituted and ether substituted derivatives such as 2-methyl metadioxane, 2.5 dimethylparadioxane, 2.3 diphenylparadioxane, 2.3 diethoxydioxane

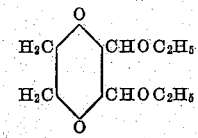

and the like. Condensed or polynuclear derivatives may also be used, such as benzo 1.3 dioxene (saligenin methylene ether)

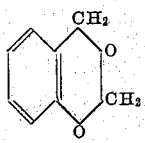

benzo 1.4 dioxene (pyrocatechol ethylene ether)

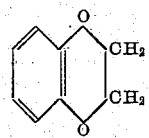

dibenzo 1.4 dioxine (diorthophenylene dioxide)

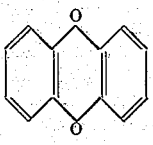

Compounds containing 2 dioxane rings are also useful such as the naphthodioxanes (glyoxal bisethylene acetals)

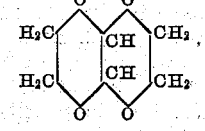

and the corresponding benzo compounds, glyoxalbis-orthophenylene acetals

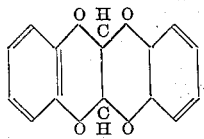

Some of these solvents are liquids at ordinary temperatures such as 1.4 dioxane and others are solids and, of course, are used as solvents at temperatures above their melting point. For most purposes for which the solutions of the present invention are practically used, however, high temperatures are not necessary, and therefore solvents which are liquid at ordinary temperatures are preferred. In many cases, however, those solid at ordinary temperatures are useable as they are high boiling and permit obtaining higher temperatures.

Perhaps the most important mono nuclear phenol compound useable according to the present invention is phenol itself, or its alkali metal salts. Likewise, substituted mono nuclear phenols such as the nitro and halogen substituted materials, and their alkali metal salts are also suitable inasmuch as all of these compounds are soluble in heterocyclic ethers.

The most important polynuclear phenol, which is itself soluble, and the alkali metal salts of which can be dissolved according to the present invention are, of course, the naphthols alpha and beta. The invention, of course, is not limited to these compounds but is generally useable with polynuclear phenols and their alkali metal salts in which there are not sufficient polar groups to render their alkali metal salts insoluble in the solvents of the present invention. In general, the mono alkali metal salts of polyhydroxy, polynuclear compounds are more soluble than the corresponding dialkaline metal salts. The solubility of all of the polynuclear phenols is not the same in any one of the solvents of the present invention and the solubility of any given polynuclear phenol in different solvents of the present invention of course will also vary. In many cases the solubility at lower temperatures is not sufficient and solutions must be prepared at higher temperatures. In some cases, this necessitates using some of the higher boiling heterocyclic solvents of the present invention. In each case, of course, the solvents best suited for the particular conditions will be chosen.

The solutions of the present invention may be prepared in many ways. Thus, for example, the alkali metal salt of the mono- or polynuclear phenols may be dissolved in the solvent. In other cases, it is desirable to dissolve the phenol itself and react it with alkali metal, its hydroxide or amide in the presence of the solvent.

Another important method of producing solutions of the present invention is in connection with the production of the mono- or polynuclear phenol by an alkali fusion. Thus, for example, when benzene sulfonic acid or a naphthalene monosulfonate is fused with caustic alkali to form the alkali phenolate or naphtholate, this crude material which contains excess caustic alkali and alkali metal sulfite may be leached or otherwise treated with the solvent which will dissolve the alkali metal phenolate or naphtholate or corresponding other mono- or polynuclear phenol, leaving the sulfite and caustic alkali undissolved. This method is particularly attractive because it eliminates any necessity of recovering the alkali metal salt of the phenol or the phenol itself from the metal, and is therefore much cheaper. At the same time, it produces a very high grade of product and can be used as a step in producing the phenol from the alkali metal itself.

In another modification, the mono- or polynuclear phenol is caused to react with caustic alkali in the solvent. Water is produced by the salt formation and this water can be removed by distillation with or without distilling off a portion of the solvent provided, however, that the solvent has a suitable boiling point. The water may also be removed by using a dehydrating agent such as caustic alkali, calcium oxide, barium oxide or calcium carbide.

Because of its low price and good solvent action, 1.4 dioxane is the preferred solvent. Particularly, for the solutions of the alkali metal phenolate or naphtholates dioxane is the most practical solvent material, as the solution can be effected at moderate temperatures and dehydration by means of distillation or sodium hydroxide is feasible to the practical extent at temperatures of 50–100° C. More complete dehydration may be effected with barium oxide or calcium carbide.

The preferred form of the invention is shown in the accompanying flow sheet from which it will be noted that a cyclic process may consist of, first, dissolving an acidic material of the type defined in a heterocyclic ether followed by reaction with the hydroxide of the alkali metal desired in the final product as cyanide. This then forms an alkali metal salt in solution together with chemical water. The latter may be removed to the desired extent by an azeotropic distillation, the solvent being recovered from the distillate by fractional distillation or otherwise and returned to the cycle. While it is desirable that the heterocyclic ether solution of the alkali metal salt be substantially anhydrous when reacted with HCN, yet quantities of water not detrimental either to the reaction or to the recovery of the final product will not be harmful.

To this solution of the alkali metal salt, HCN is then added, either in liquid or gas phase to form the corresponding alkali metal cyanide which being insoluble in the solution, will precipitate and may be recovered as such. At the same time, the initial acidic material will be regenerated and may be returned to the start of the cycle in the heterocyclic ether solvent.

The reaction with HCN may be carried out at any desirable temperature which will not produce either polymerization of the HCN or azulmic decomposition of the resultant alkali metal cyanide to any substantial extent.

As a result of this reaction, a simple filtering operation will remove the solid alkali metal cyanide from the regenerated acidic material, the latter being returned to the cycle.

*Example I*

One mol of caustic soda and 1.2 mols of phenol are boiled together in sufficient dioxane to dissolve the resulting sodium phenolate and the water of reaction azeotropically distilled therefrom. After the water removal, the solution remaining in the still is filtered to remove impurities which remain undissolved. Upon cooling, one mol of HCN is introduced with agitation, the temperature employed being sufficiently low to prevent undue vaporization of the HCN. Sodium cyanide being insoluble in dioxane, is precipitated as a white solid. The reaction mixture is filtered and the sodium cyanide washed with dioxane to remove phenol adhering to the crystals.

The filtrate containing the excess phenol and the phenol regenerated by the HCN reaction is returned to the start of the cycle for reaction with additional quantities of caustic soda.

It is to be noted that in the above example an amount of phenol is used exceeding that necessary to react with the quantity of NaOH used. This excess was chosen because it is known that HCN polymerized rapidly in contact with strong alkali. Consequently in order to prevent this undesirable decomposition, the alkalinity was cut down by using an excess of phenol.

Example II

Three parts by weight of beta naphthol are dissolved in fifteen parts of dioxane. Two parts by weight of caustic soda—ground and powdered—are added. The mixture is stirred at room temperature until a sample of the solution gives a clear solution in water which indicates the absence of unreacted free naphthol. The temperature is then raised to 80–90° C. for a short period of time (10 to 15 minutes). The sodium hydroxide dehydrates the dioxane solution and forms a heavier aqueous layer. The two layers are separated by siphoning. One part of caustic soda is added to the dioxane layer and the process of dehydration is repeated in the same manner. This time the sodium hydroxide does not form any more an aqueous layer. When HCN is passed through the dehydrated solution, sodium cyanide is precipitated and beta naphthol regenerated. The former is separated by filtration and the latter returned to the cycle.

Example III

Two parts by weight of beta-naphthol are dissolved in ten parts of dioxane and two parts by weight of caustic soda are added. The mixture is agitated until a small quantity of it gives a clear solution in water, indicating a complete conversion of the naphthol to its sodium salt. Then the mixture is heated to 80–90° for a brief period of time (e. g., 15 min.) whereupon the excess of caustic separates out in a lower aqueous layer. The upper, dioxane, layer, thus dehydrated, is siphoned off. To it is added now one part by weight of ground calcium carbide, and the mixture is heated with stirring to 90–95° for 1 to 1½ hours. This operation removes all moisture. The solution of beta naphthol in dioxane is separated from the calcium oxide and unchanged calcium carbide by siphoning through a filter cloth. By cooling the solution to a temperature below the boiling point of HCN, liquid HCN may then be added which, upon stirring, precipitates sodium cyanide, while beta naphthol is regenerated.

Example IV

Three parts by weight of phenol are dissolved in fifteen parts of dioxane. The equivalent amount of caustic potash (powder) is added. Then it is proceeded like in Example III using also here sodium hydroxide as dehydrating agent.

Example V

A solution of sodium alpha naphtholate or potassium alpha naphtholate is prepared in an analogous manner as described in Example III. Because of the lower solubility of the sodium alpha naphtholate the reaction with sodium hydroxide is carried out at 50–60° and the dehydration at boiling temperature. NaCN or KCN respectively is then formed and recovered by the process of the above example.

Example VI 1975 parts by weight of caustic soda (95 per cent) and 400 parts of water are melted together in a fusion pot, and heated to 305° C. while stirred. Then 3941 parts by weight of moist sodium benzene sulfonate (9.1% water) are gradually added. Then the melt is kept at 300° for six hours. The melt is cooled and ground. Seven parts by weight of this melt, containing a mixture of sodium hydroxide, sodium sulfite and sodium phenolate are mixed with fourteen parts by weight of dioxane and stirred for 15 minutes at 70–80°. The mixture is filtered off from the insoluble inorganic material which is washed with 1.4 parts of dioxane. The solution when dehydrated and treated with HCN yields solid NaCN and regenerated phenol.

Example VII 10 parts by weight of phenol are dissolved in 125 parts by weight of dry benzo-1,4-dioxene. The equivalent amount of sodium hydroxide is added and the mixture is slowly heated under stirring. A clear solution is obtained after some time. At higher temperature the water formed distills off. In order to ensure complete dehydration about one-fifth of the benzo-dioxene is distilled off. The sodium phenolate is then reacted with HCN to produce solid NaCN.

The above examples are typical of those using acidic materials, solvents and alkali metal compounds. The successful operation of this cyclic process is dependent upon the choice of an acidic material which will form an alkali metal salt, which salt and which acidic material are both soluble in the same organic solvent. It has been found in all cases that under these circumstances, following water removal, the addition of HCN forms the corresponding alkali metal cyanide, which rather surprisingly is insoluble in the above class of solvent. Consequently, not only is the alkali metal cyanide precipitated in a state of good purity but the acidic material is regenerated and may be returned to the cycle.

The above process represents an important contribution to the production of high grade alkali metal cyanides in a solid state inasmuch as, while the source of the final cyanide is an alkali metal compound and HCN, yet by the use of the intermediate mediums of acidic materials often occurring as waste products and an organic solvent, the alkali metal salt is obtained in solid state without presenting the difficulty of removing it from an aqueous solution. In the cyclic processes, the initial acidic material is substantially completely regenerated and it and the organic solvent may be returned to the cycle without substantial loss.

While the invention has been shown and described with particular reference to specific embodiments, it is to be understood that it is not to be limited thereto but is to be construed broadly and restricted solely by the scope of the appended claims.

I claim:

1. A method of preparing an alkali metal cyanide which includes the steps of reacting a substantially anhydrous heterocyclic ether solution of an alkali metal salt with HCN, and separating and recovering the precipitated alkali metal cyanide thus formed.

2. The method of claim 1 in which the heterocyclic ether is dioxane.

3. The method of claim 1 in which the alkali metal salt is that of a phenol.

4. A method of preparing alkali metal cyanide which includes the steps of reacting a heterocyclic ether solution of an acidic material with alkali metal hydroxide, substantially dehydrating the solution of the thus produced alkali metal salt and reacting said alkali metal salt in ether solution with HCN, and separating and recovering the precipitated alkali metal cyanide thus formed.

5. The method of claim 4 in which the heterocyclic ether is dioxane.

6. The method of claim 4 in which the acidic material is a phenol.

7. The method of claim 4 with the additional step of returning the filtrate from the alkali metal cyanide separation step, and containing regenerated acidic material to the start of the cycle.

8. A method of producing alkali metal cyanide which includes the steps of reacting a heterocyclic ether solution of an acidic material, the alkali metal salt of which is also soluble in said ether, with alkali metal hydroxide to form said salt, substantially dehydrating the solution, reacting the ether solution of the sodium salt with HCN, separating the thus precipitated alkali metal cyanide, and returning the heterocyclic ether solution of the thus regenerated material to the start of the cycle.

9. The method of claim 8 in which the acidic material is a phenol, the heterocyclic ether is dioxane, and the alkali metal hydroxide is sodium hydroxide.

WILLIAM H. HILL.